US010962818B1

(12) United States Patent
Campbell et al.

(10) Patent No.: US 10,962,818 B1
(45) Date of Patent: Mar. 30, 2021

(54) SYSTEM AND METHOD FOR OPTIMIZING WARM-UP TIME ON LARGE FORMAT DISPLAYS

(71) Applicant: Rockwell Collins, Inc., Cedar Rapids, IA (US)

(72) Inventors: Thomas B. Campbell, Cedar Rapids, IA (US); Christian T. Deloy, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/571,824

(22) Filed: Sep. 16, 2019

(51) Int. Cl.
*G02F 1/1333* (2006.01)
(52) U.S. Cl.
CPC .............................. *G02F 1/133382* (2013.01)
(58) Field of Classification Search
None
See application file for complete search history.

(56) References Cited

U.S. PATENT DOCUMENTS

| | | | |
|---|---|---|---|
| 4,987,289 A | 1/1991 | Bishop et al. | |
| 6,072,459 A * | 6/2000 | Asakawa | G02F 1/133382 345/101 |
| 6,535,266 B1 * | 3/2003 | Nemeth | G02F 1/133382 349/161 |
| 2004/0207588 A1 * | 10/2004 | Shiomi | G02F 1/133382 345/87 |
| 2010/0044361 A1 * | 2/2010 | Lin | H05B 1/0227 219/209 |
| 2013/0194523 A1 * | 8/2013 | Long | H05B 3/84 349/21 |
| 2015/0138462 A1 * | 5/2015 | Yang | G02F 1/136286 349/21 |
| 2017/0082745 A1 * | 3/2017 | Kronfeld | G01S 7/22 |

* cited by examiner

*Primary Examiner* — Shan Liu
(74) *Attorney, Agent, or Firm* — Suiter Swantz pc llo

(57) ABSTRACT

A system for optimizing warm-up time of a display device may include a display device including a display substrate configured to display at least one image, the display substrate including a first display zone and at least one additional display zone. The display device may further include one or more heating layers including a first heating layer portion and at least one additional heating layer portion. The system may further include a controller configured to: generate a first electrical current within the first heating layer portion in order to increase a temperature of the first display zone of the display substrate; and generate at least one additional electrical current within the at least one additional heating layer portion in order to increase a temperature of the at least one additional display zone of the display substrate.

13 Claims, 9 Drawing Sheets

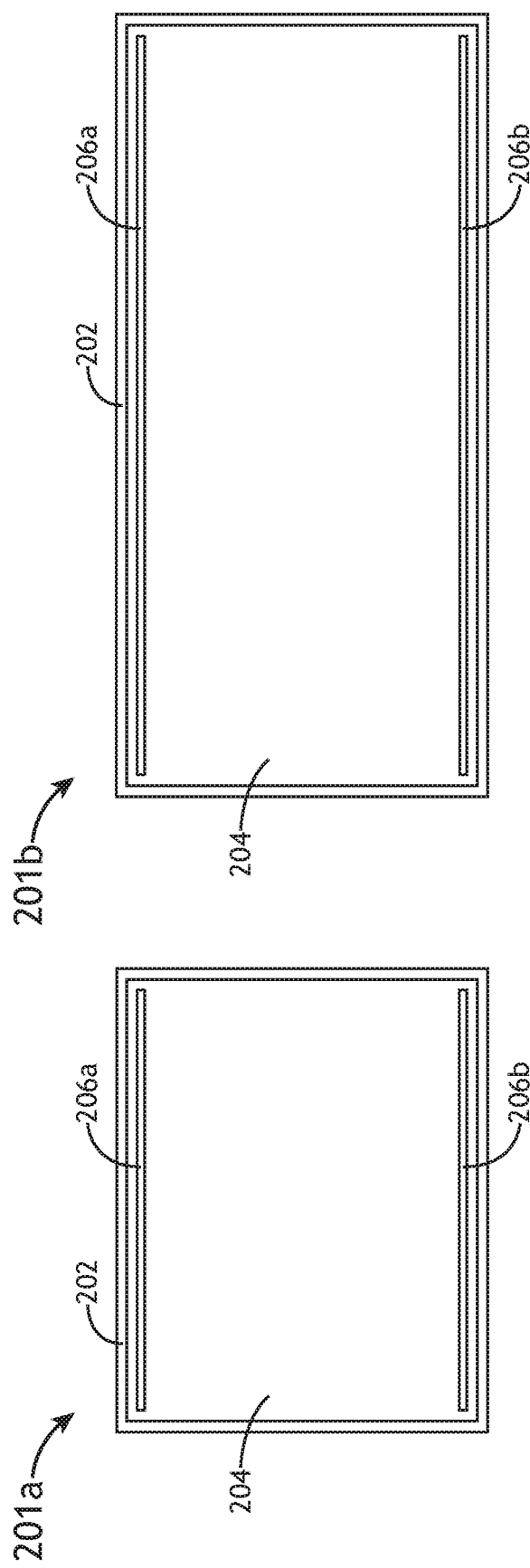

SYSTEM AND METHOD FOR OPTIMIZING WARM-UP TIME ON LARGE FORMAT DISPLAYS

BACKGROUND

Many display devices require lengthy warm-up time requirements in order for the display devices to reach adequate operating temperatures. Required warm-up times may be lengthened when the display devices are to be operated in cold environments. For example, liquid crystal display (LCD) devices may require lengthy warm-up times when started from a cold state in order to reach sufficient operating temperatures required for the LCD device to produce sufficient ranges of colors, contrasts, and luminance levels.

Next-generation aircraft are being fitted with large-format display devices (e.g., large-format LCD devices). In the context of aviation, performance issues associated with lengthy warm-up times for display devices may pose a danger to both the aircraft and passengers/personnel aboard the aircraft. In particular, aircraft personnel have a need for display devices to be fully functional within minutes of power being provided to the display device. For example, warning signals indicative of a dangerous engine condition (e.g., overheating engine temperature) may be displayed in bright red on a display device within the aircraft cockpit. With lengthy warm-up times, the display device may not be able to reach an operating temperature capable of effectively displaying the bright red warning to aircraft personnel before an engine failure may be avoided. By the time the display device has warmed up sufficiently to effectively display the warning signals, the dangerous engine condition associated with the warning signals may be irreversible, potentially damaging the aircraft engine and endangering aircraft personnel and passengers.

Previous techniques used to improve warm-up time of display devices (e.g., LCD devices) have utilized heating layers used to warm-up display substrates of the display devices. However, previous techniques used to improve warm-up times are expensive and unable to match the scale of increasingly large displays. In particular, as the size of aircraft cockpit display devices continue to increase, the amount of power consumption required with previous techniques must scale accordingly. This increased power consumption increases heater size and cost, and oftentimes exceeds the available power of the aircraft. Thus, previous display heating techniques are unbale to be utilized with growing aircraft display devices.

Therefore, there exists a need for a system and method which cure one or more of the shortcomings identified above.

SUMMARY

A system for optimizing warm-up time of a display device is disclosed. In embodiments, the system includes a display device. The display device may include a display substrate configured to display at least one image on a front surface of the display substrate, the display substrate including a first display zone and at least one additional display zone. The display device may further include one or more heating layers coupled to a rear surface of the display substrate, the one or more heating layers including a first heating layer portion and at least one additional heating layer portion. The system may further include a controller communicatively coupled to the heating layer via one or more electrical couplings. The controller may be configured to: generate one or more control signals configured to generate a first electrical current within the first heating layer portion in order to increase a temperature of the first display zone of the display substrate; and generate one or more control signals configured to generate at least one additional electrical current within the at least one additional heating layer portion in order to increase a temperature of the at least one additional display zone of the display substrate.

In some embodiments, of the system, the controller is further configured to receive a display warm-up request at a first time, and generate the one or more control signals configured to generate the first electrical current at the first time in response to the display warm-up request.

In some embodiments, of the system, the controller is further configured to determine the temperature of the first display zone exceeds a temperature threshold at a second time subsequent to the first time, generate the one or more control signals configured to generate the second electrical current at the second time, and generate one or more control signals configured to terminate the first electrical current at the second time.

In some embodiments, of the system, the at least one additional display zone includes a second display zone and a third display zone, and the least one additional heating layer portion includes a second heating layer portion coupled to the rear surface of the display substrate proximate to the second display zone, and a third heating layer portion coupled to the rear surface of the display substrate proximate to the third display zone.

In some embodiments, of the system, generating one or more control signals configured to generate at least one additional electrical current within the at least one additional heating layer portion in order to increase a temperature of the at least one additional display zone of the display substrate includes generating one or more control signals configured to generate a second electrical current within the second heating layer portion in order to increase a temperature of the second display zone of the display substrate, and generating one or more control signals configured to generate a third electrical current within the third heating layer portion in order to increase a temperature of the third display zone of the display substrate.

In some embodiments, of the system, the one or more electrical couplings include a first set of one or more electrical couplings configured to electrically couple the controller to the first heating layer portion, and at least one additional set of one or more electrical couplings configured to electrically couple the controller to the at least one additional heating layer portion.

In some embodiments, of the system, the first set of one or more electrical couplings includes a first sub-set of one or more electrical couplings coupled to the first heating layer along a first edge of the heating layer, and a second sub-set of one or more electrical couplings coupled to the first heating layer along a second edge of the heating layer opposite the first edge.

In some embodiments, of the system, the display device is disposed within a cockpit of an aircraft.

In some embodiments, of the system, the first heating layer portion and the at least one additional heating layer portion are electrically isolated from one another.

In some embodiments, of the system, the display device is disposed within a cockpit of an aircraft.

In some embodiments, of the system, at least one of the first heating layer or the at least one additional heating layer includes an indium tin oxide (ITO) layer.

In some embodiments, of the system, the one or more electrical couplings include at least one of a metalized strip or a flexible circuit.

In some embodiments, of the system, the display substrate includes a liquid crystal display (LCD) substrate, and the display device further includes a backlight coupled to the one or more heating layers, wherein the one or more heating layers are disposed between the display substrate and the backlight.

In some embodiments, of the system, the first display zone includes engine-indicating and crew-alerting (EICAS) information.

A system for optimizing warm-up time of a display device is disclosed. In embodiments, the system includes one or more heating layers coupled to a surface of a display substrate of a display device, the one or more heating layers including a first heating layer portion and at least one additional heating layer portion. In embodiments, the system further includes a controller communicatively coupled to the first heating layer portion and the second heating layer portion, the controller configured to: generate one or more control signals configured to generate a first electrical current within the first heating layer portion in order to increase a temperature of a first display zone of the display substrate; and generate one or more control signals configured to generate at least one additional electrical current within the at least one additional heating layer portion in order to increase a temperature of at least one additional display zone of the display substrate.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2A illustrates a display device including a display substrate and a heating layer.

FIG. 2B illustrates a display device including a large-format display substrate and a heating layer.

DETAILED DESCRIPTION

Figure 1:
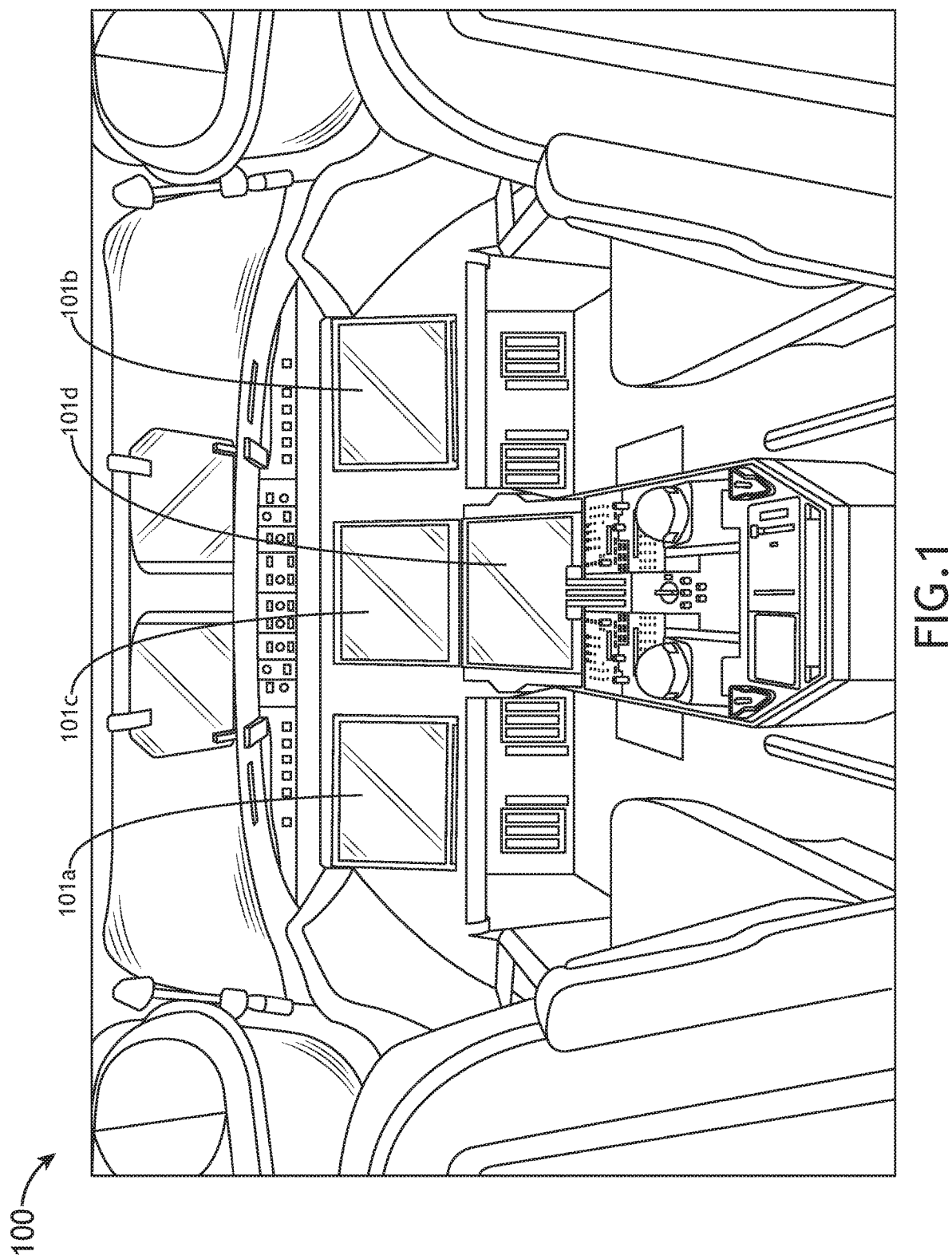
FIG. 1 illustrates an aircraft environment in which a warm-up system for optimizing warm-up time of a display device may be implemented, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Many display devices require lengthy warm-up time requirements in order for the display devices to reach adequate operating temperatures. Required warm-up times may be lengthened when the display devices are to be operated in cold environments. For example, liquid crystal display (LCD) devices may require lengthy warm-up times in order to reach sufficient operating temperatures required for the LCD device to produce the range of colors, contrasts, and luminance levels which are expected.

Next-generation aircraft are being fitted with large-format display devices (e.g., large-format LCD devices). In the context of aviation, performance issues associated with lengthy warm-up times for display devices may pose a danger to both the aircraft and passengers/personnel aboard the aircraft. In particular, aircraft personnel have a need for display devices to be fully functional within minutes of power being provided to the display device. For example, warning signals indicative of a dangerous engine condition (e.g., overheating engine temperature) may be displayed in bright red on a display device within the aircraft cockpit. With lengthy warm-up times, the display device may not be able to reach an operating temperature capable of effectively displaying the bright red warning to aircraft personnel before an engine failure may be avoided. By the time the display device has warmed up sufficiently to effectively display the warning signals, the dangerous engine condition associated with the warning signals may be irreversible, potentially damaging the aircraft engine and endangering aircraft personnel and passengers.

Previous techniques used to improve warm-up time of display devices (e.g., LCD devices) have utilized heating layers used to warm-up display substrates of the display devices. However, previous techniques used to improve warm-up times are expensive and unable to match the scale of increasingly large displays. In particular, as the size of aircraft cockpit display devices continues to increase, the amount of power consumption required with previous techniques must scale accordingly. This increased power consumption increases heater size and cost, and oftentimes exceeds the available power of the aircraft. Thus, previous display heating techniques are unbale to be utilized with growing aircraft display devices.

Accordingly, embodiments of the present disclosure are directed to a warm-up system and method for curing one or more of the shortfalls of the previous approaches identified above. Embodiments of the present disclosure are directed to a warm-up system including a display device including one or more heating layers configured to warm up selected zones of a display substrate of the display device. In particular, embodiments of the present disclosure are directed to heating layers of a display device which are configured to warm up selected/localized zones of a display substrate which include critical aircraft information prior to warming up additional zones of the display substrate.

It is contemplated herein that embodiments of the present disclosure may improve warm-up times of display devices. Attendant advantages of the present disclosure may be particularly important in the context of aircraft display devices, and when operating display devices in cold environments. It is further contemplated herein that embodiments of the present disclosure may provide for the heating of large-format display devices in localized regions which meets performance requirements while limiting the power consumption, size, and/or cost for display device warm-up systems. Accordingly, it is contemplated herein that embodiments of the present disclosure may enable display device warm-up systems to be implemented in ever-growing aircraft display devices.

FIG. 1 illustrates an aircraft environment 100 in which a warm-up system for optimizing warm-up time of a display device may be implemented, in accordance with one or more embodiments of this disclosure.

In embodiments, the aircraft environment 100 includes one or more display devices 101 which may be employed to present aircraft performance parameters (e.g., engine-indicating and crew-alerting (EICAS) information), aircraft performance parameter predictions, sensor readings, electronic maps, aircraft data, communications, alerts, and so forth. The aircraft environment 100 in FIG. 1 is shown to include multi-function displays (e.g., display device 101a, 101b) and flight displays (e.g., display device 101c, 101d) which are viewable by one or more flight crew members (e.g., pilots). The aircraft environment 100 illustrated in FIG. 1 illustrates an example embodiment. However, in other embodiments, the aircraft 100 environment can include any number of mechanical input devices and/or display devices.

Although example embodiments of the present disclosure are shown and described in an aircraft environment/cockpit (e.g., aircraft environment 100), the inventive concepts of the present disclosure may be configured to improve warm-up times of any display device known in the art. For example, the embodiments of the present disclosure may be incorporated into display devices of any air, land, or water-based personal equipment or vehicle, commercial equipment or vehicle, military equipment or vehicle, and the like. For instance, embodiments of the present disclosure may be incorporated into the display device of an automobile, an aquatic vehicle, a spacecraft, and the like. In the interest of simplicity and to most clearly define the inventive concepts of the present disclosure, embodiments may be described throughout the present disclosure in an aircraft environment. However, these references are not to be regarded as limiting. Thus, references to "aircraft," "aviation," "avionics," and like terms should not be interpreted as a limitation on the present disclosure, unless noted otherwise herein.

It is further noted herein that, where the environment includes an aircraft environment, the system and method for display device warm-up time improvement may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

FIGS. 2A-2B illustrate a display device 201a including a display substrate 202 and a heating layer 204. FIG. 2B illustrates the display device 201b including a large-format display substrate 202 and a heating layer 204. In particular, the display device 201a, 201b depicted in FIGS. 2A-2B is shown as an example display device implementing traditional techniques to improve warm-up time of the display substrate 202. It is contemplated herein that a brief description of the display device 201a, 201b may provide a reference point against which attendant advantages of the present disclosure may be compared.

As noted previously herein, LCD devices typically exhibit long warm-up times when started/initialized from a cold state, and may therefore benefit from warm-up systems designed to shorten required warm-up times. In this regard, the display device 201a, 201b illustrated in FIGS. 2A and 2B may include, but is not limited to, an LCD device. A display device 201a, 201b implementing traditional heating techniques may include a display substrate 202 and a heating layer 204. The display substrate 202 may be configured to generate/display images on a front surface of the display substrate 202 to a viewer. For example, the display substrate 202 may be configured to display aircraft sensor readings to a pilot within an aircraft environment. The heating layer 204 may be coupled to a rear surface of the display substrate 202 such that the heating layer 204 covers all of the rear surface of the display substrate 202, as shown in FIGS. 2A-2B.

The heating layer 204 may include one or more low-impedance connection points electrically coupled to a power source. For example, the heating layer 204 may include a first connection point (e.g., first electrical coupling 206a) disposed on an upper edge of the heating layer 204, and a second connection point (e.g., second electrical coupling 206b) disposed on a lower edge of the heating layer 204. When the display device 201a, 201b is to be activated, an electrical current may be passed through the heating layer 204 in order to heat the heating layer 204 and the display substrate 202. For example, an electrical current may be passed through the heating layer 204 from the first electrical coupling 206a to the second electrical coupling 206b such that the electrical current flows "downwards" through the heating layer 204.

The display devices 201a, 201b illustrated in FIGS. 2A-2B typically require approximately 2 Watts/in$^2$ to effectively warm-up the display substrate 202. These power requirements make the implementation of heating layers 204 in smaller-format display devices 201a, 201b relatively straightforward. For example, in the smaller-format display device 201a, the power consumption of the heating layer 204 is relatively low to moderate, which supports the implementation of low cost, low power consumption power supplies.

However, as the size of the display device increases, the amount of power consumption must scale accordingly, thereby increasing size, cost, and power consumption of the power supply required to achieve the same warm-up requirement. With large-format displays, the power consumption required by the heating layer 204 may exceed the available power of the aircraft.

For example, FIG. 2B illustrates a display device 201b including a large-format display substrate 202. Next generation aircraft are now being fitted with large-format LCD devices, some with display areas (e.g., area of display substrate 202) of 8"×20" or larger. As noted previously herein, the issue with large-format displays (e.g., display device 201b illustrated in FIG. 2B) is that the power consumption required to heat the heating layer 204 and display substrate 202 is often higher than the available power on the aircraft. For retrofit aircraft, the power available to heat the display device 201b may be approximately 200 Watts, which is adequate for display devices 201b up to only 10"×10" in size based on the 2 Watts/in$^2$ power estimation (e.g., 10 in*10 in=100 in$^2$*2 Watts/in$^2$=200 Watts). Accordingly, any displays larger than 10"×10" in size may require higher power levels than may be available on the aircraft.

For example, the large-format display device 201b may exhibit a size of approximately 8"×20", which is consistent with the size of some large-format display devices currently being installed within next generation aircraft. Using traditional heating techniques, the large-format display device 201b illustrated in FIG. 2B may require approximately 320 Watts of power (e.g., 8 in*20 in=160 in$^2$*2 Watts/in$^2$=320 Watts). Assuming an aircraft power budget of 200 Watts, this represents 60% more than the available power budget of the aircraft, and would therefore take approximately 60% longer for the large-format display device 201b to warm-up to operational temperature. In the context of aviation, these increased warm-up times may be unacceptable, as aircraft personnel typically require display devices 201b to be fully functional within minutes after application of power in order to monitor engine status during cold start conditions.

While the power budget allocated to display device warm-up may be increased to account for larger format display devices 201b, this is undesirable, as it may increase the overall power requirements of the aircraft and/or reduce the power budget for other aircraft systems. Additionally, even if the power budget allocated to display device warm-up were to be increased, this would require larger, heavier, and more numerous cables/connections running to the display device 201, which further complicates and adds unnecessary weight to the aircraft.

Accordingly, previous heating techniques are ill-suited for large-format displays, and are largely unable to scale alongside growing aircraft display devices. In this regard, embodiments of the present disclosure are directed to a warm-up system and method which cure one or more of the shortfalls of previous approaches identified above.

Figure 3A:
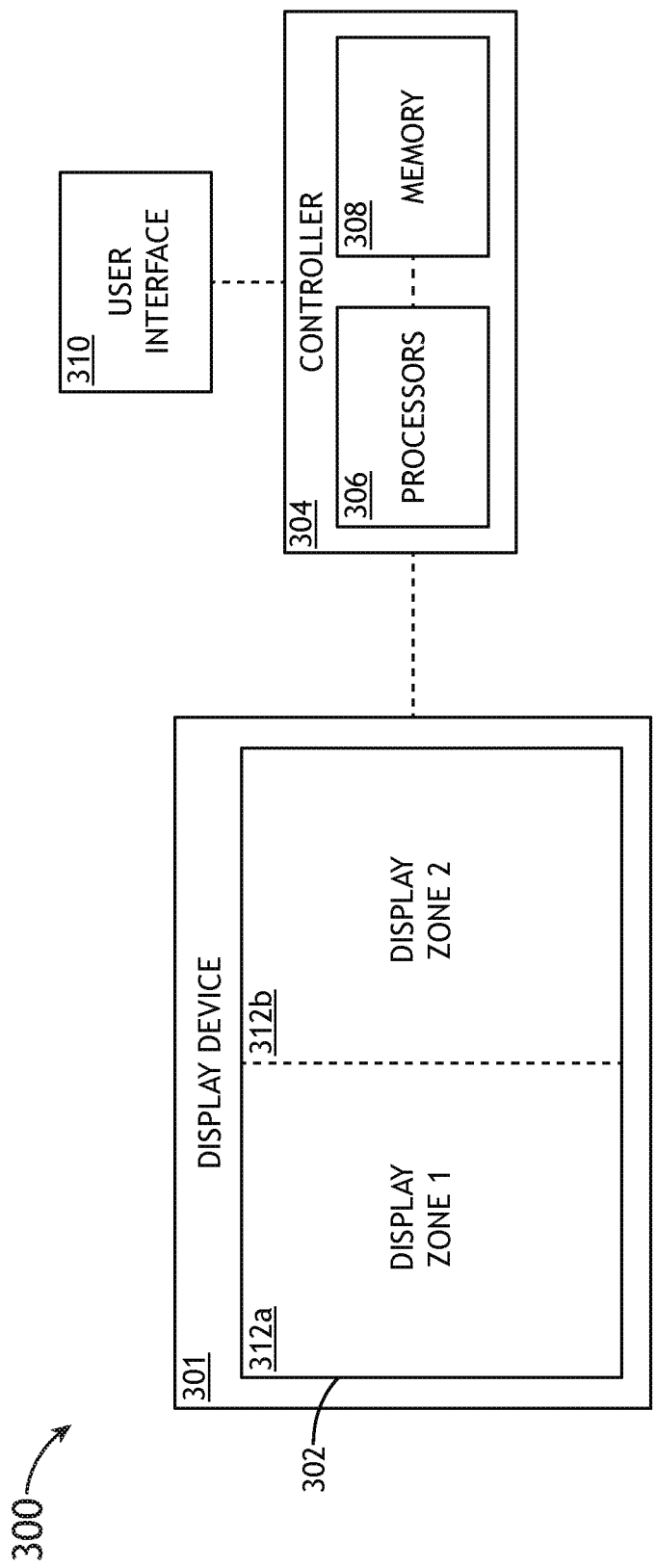
FIG. 3A illustrates a simplified block diagram of a warm-up system for optimizing warm-up time of a display device, in accordance with one or more embodiments of the present disclosure.

FIG. 3A illustrates a simplified block diagram of a warm-up system 300 for optimizing warm-up time of a display device 301, in accordance with one or more embodiments of the present disclosure. The warm-up system 300 may include, but is not limited to, a display device 301, a display substrate 302, a controller 304, one or more processors 306, and a memory 308. In embodiments, the warm-up system 300 may further include a user interface 310.

The display device 301 may include any display device including a display substrate 302 known in the art. For example, in embodiments, the display device 301 may include, but is not limited to, a head-up display (HUD), a head-mounted display (HMD) a vehicle-mounted display (e.g., aircraft cockpit display device 101 illustrated in FIG. 1), a mobile device display (e.g., smart phone display, handheld display, smart watch display, and the like). In this regard, while much of the present disclosure is directed to a warm-up system 300 in the context of an aircraft environment 100 (e.g., aircraft cockpit display, HUD, HMD, and the like), it is contemplated herein that embodiments of the present disclosure may be applied to display devices 301 in contexts other than an aircraft environment 100.

In embodiments, the display substrate 302 is configured to display one or more images to a viewer (e.g., aircraft pilot, aircraft personnel). For example, the display substrate 302 may be configured to display one or more images on a front surface of the display substrate 302. The display substrate 302 may include any display substrate known in the art including, but not limited to, liquid crystal display (LCD) substrates, emissive pixelated display substrates (e.g., OLEDs), and the like.

In embodiments, the display substrate 302 may include one or more display zones 312. In this regard, the display substrate 302 may be divided up into multiple display zones 312. For example, as shown in FIG. 3A, the display substrate 302 may include a first display zone 312a, and a second display zone 312b. The display substrate 302 may include any number of display zones 312. For example, as shown in FIG. 3B, the display substrate 302 may include a first display zone 312a, a second display zone 312b, and a third display zone 312c.

It is contemplated herein that the display substrate 302 may be partitioned, divided, and/or arranged into any number of display zones 312. For example, the display zones 312a-312c illustrated in FIGS. 3A-3C are shown in a vertical orientation within the display substrate 302. In additional and/or alternative embodiments, display zones 312a-312c may be arranged in a horizontal orientation within the display substrate 302. In this regard, the display substrate 302 may exhibit any array of display zones 312 known in the art.

Figure 3B:
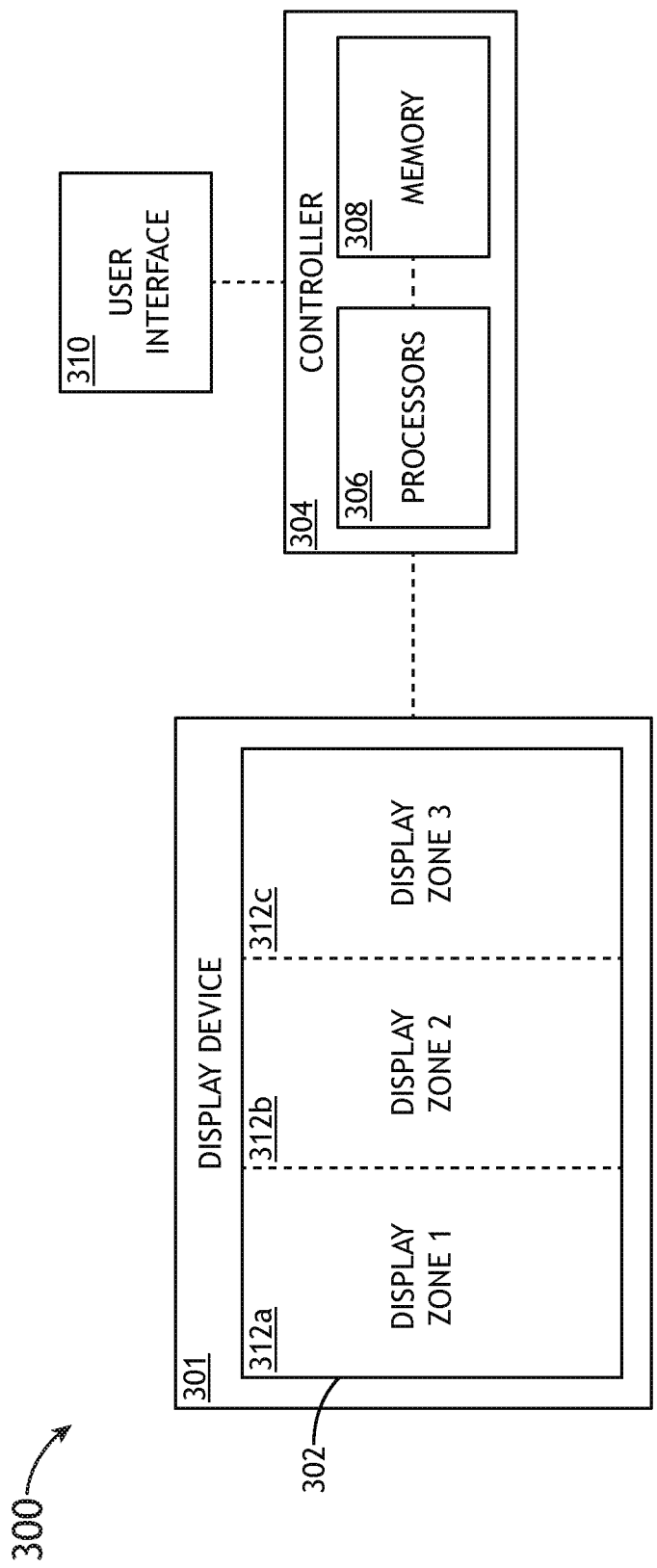
FIG. 3B illustrates a simplified block diagram of a system for optimizing warm-up time of a display device, in accordance with one or more embodiments of the present disclosure.
Figure 3C:
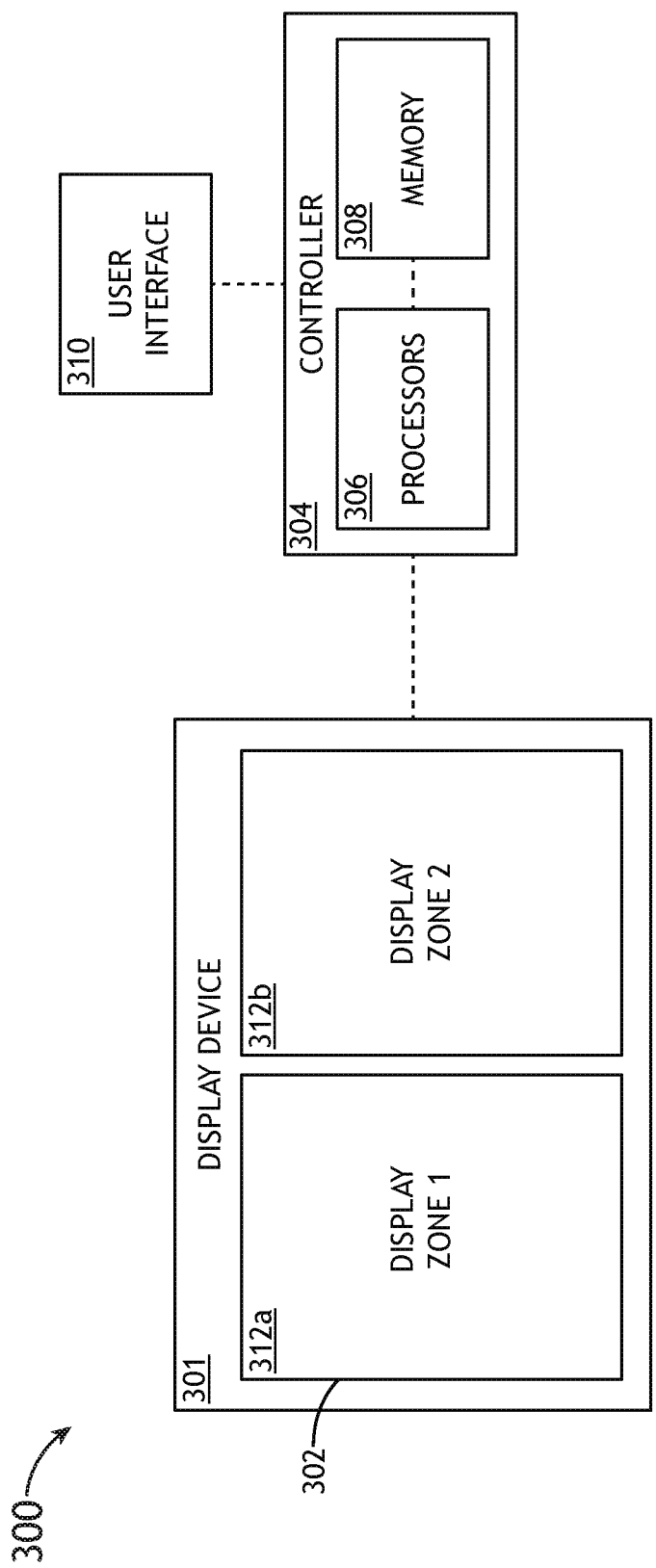
FIG. 3C illustrates a simplified block diagram of a system for optimizing warm-up time of a display device, in accordance with one or more embodiments of the present disclosure.

Furthermore, while the display substrates 302 illustrated in FIGS. 3A-3B illustrate a display substrate 302 with a single image area divided into display zones 312, this is not to be regarded as a limitation of the present disclosure, unless noted otherwise herein. In this regard, the display substrate 302 may considered to be divided into multiple image areas. This may be further understood with reference to FIG. 3C.

FIG. 3C illustrates a simplified block diagram of a warm-up system 300 for optimizing warm-up time of a display device 301, in accordance with one or more embodiments of the present disclosure. As shown in FIG. 3C, the display substrate 302 may be exhibit multiple separate image areas such that a first image area includes the first display zone 312a, and a second image area includes the second display zone 312b.

By dividing the display substrate 302 up into various display zones 312, the warm-up system 300 may be configured to heat the display substrate 302 in localized zones/areas (e.g., display zones 312) in order to allow critical areas of the display substrate 302 to be heated to operational temperature prior to less critical areas. It is contemplated herein that heating various display zones 312 of the display substrate 302 in a selected, sequential manner may enable the warm-up system 300 to decrease warm-up times for critical information on large format displays, while complying with available power budgets of the aircraft. This will be described in further detail herein.

In embodiments, the display device 301 and/or the display substrate 302 may be communicatively coupled to a controller 304. The display device 301 and the display substrate 302 may be communicatively coupled to the controller 304 using any wireline or wireless communication technique known in the art. The controller 304 may include a one or more processors 306 and a memory 308. Warm-up system 300 may further include a user interface 310 communicatively coupled to the controller 304, wherein the user interface 310 is configured to display information of warm-up system 300 to a user and/or receive one or more input commands from a user configured to adjust one or more characteristics of warm-up system 300. In the context of the aircraft environment 100, the user interface 310 may include any user interface within the aircraft cockpit configured to display aircraft information to a pilot and/or receive control commands from the pilot.

It is noted herein that the one or more components of warm-up system 300 may be communicatively coupled to the various other components of warm-up system 300 in any manner known in the art. For example, the display substrate 302, the controller 304, the one or more processors 306, the memory 308, and the user interface 310 may be communicatively coupled to each other and other components via a wireline (e.g., copper wire, fiber optic cable, and the like) or wireless connection (e.g., RF coupling, IR coupling, WiFi, WiMax, Bluetooth, 3G, 4G, 4G LTE, 5G, and the like).

In one embodiment, the one or more processors 306 may include any one or more processing elements known in the art. In this sense, the one or more processors 108 may include any microprocessor-type device configured to execute software algorithms and/or instructions. In one embodiment, the one or more processors 306 may consist of a desktop computer, mainframe computer system, workstation, image computer, parallel processor, or other computer system (e.g., networked computer) configured to execute a program configured to operate the warm-up system 300, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from memory 308. Moreover, different subsystems of the warm-up system 300 (e.g., display device 301, controller 304, user interface 310) may include one or more processor or logic elements suitable for carrying out at least a portion of the steps described throughout the present disclosure. Therefore, the above description should not be interpreted as a limitation on the present disclosure but merely an illustration.

The memory 308 may include any storage medium known in the art suitable for storing program instructions executable by the associated one or more processors 306. For example, the memory 308 may include a non-transitory memory medium. For instance, the memory 308 may include, but is not limited to, a read-only memory (ROM), a random-access memory (RAM), a magnetic or optical memory device (e.g., disk), a magnetic tape, a solid-state drive and the like. It is further noted that memory 308 may be housed in a common controller housing with the one or more processors 306. In an alternative embodiment, the memory 308 may be located remotely with respect to the physical location of the processors 306 and controller 304. In another embodiment, the memory 308 maintains program instructions for causing the one or more processors 306 to carry out the various steps described through the present disclosure.

In another embodiment, the controller 304 is coupled to a user interface 310. In another embodiment, the user interface 310 includes a display and/or a user input device. For example, the display may be coupled to the user input device by a transmission medium that may include wireline and/or wireless portions. The display device of the user interface 310 may include any display device known in the art. The display device of the user interface 310 may include the display device 301 or additional and/or alternative display devices. For example, the display device may include, but is not limited to, a liquid crystal display (LCD), an organic light-emitting diode (OLED) based display, a CRT display, and the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user input device (e.g., touchscreen, bezel mounted interface, keyboard, mouse, trackpad, and the like) is suitable for implementation in the present invention.

The user input device of the user interface 310 may include any user input device known in the art. For example, the user input device may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Attendant advantages of the warm-up system 300 of the present disclosure may be further illustrated with reference to FIGS. 4-6.

Figure 4:
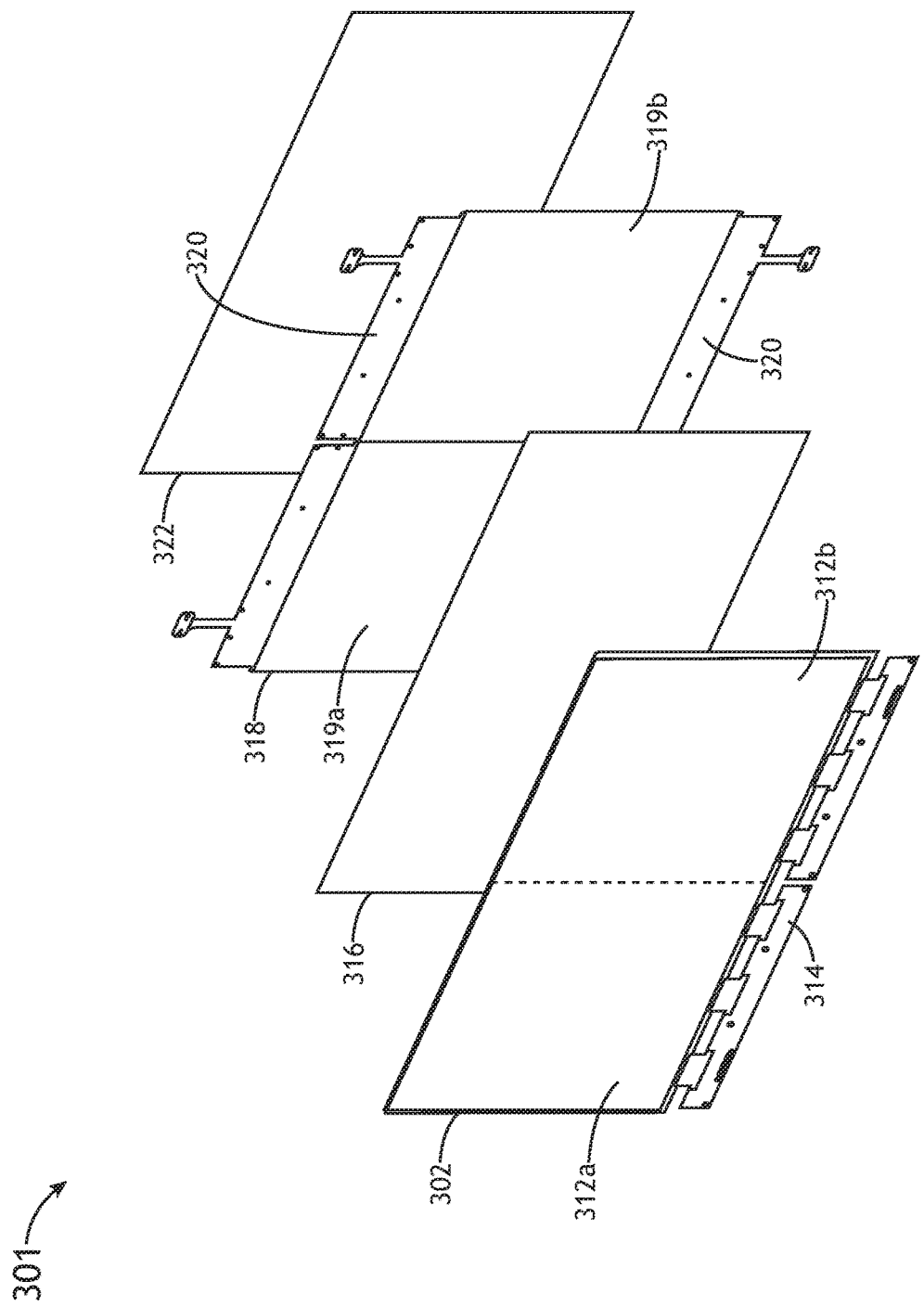
FIG. 4 illustrates an exploded view of a display device, in accordance with one or more embodiments of the present disclosure.

FIG. 4 illustrates an exploded view of a display device 301, in accordance with one or more embodiments of the present disclosure. The display device 301 may include, but is not limited to, a display substrate 302 including two or more display zones 312a, 312b, an optical coupling lamination layer 316, and one or more heating layers 318. In additional and/or alternative embodiments, the display device 301 may include a backlight 322.

As noted previously herein, the display substrate 302 may be configured to display at least one image on a front surface of the display substrate 302. Additionally, the display substrate 302 may include any display substrate known in the art including, but not limited to, an LCD substrate. In embodiments, the display substrate 302 may include multiple display zones 312. For example, as shown in FIG. 4 and FIG. 3A, the display substrate 302 may include a first display zone 312a and a second display zone 312b oriented vertically within the display substrate 302.

In embodiments, the display substrate 302 may include one or more communicative couplings 314 configured to communicatively couple the display substrate 302 to the controller 304. In this regard, the controller 304 may be configured to generate one or more control signals configured to adjust one or more characteristics of the display substrate 302. For example, in the context of a pixelated LCD substrate (display substrate 302), the controller 304 may be configured to control currents/voltages applied to pixels of the LCD substrate in order to adjust characteristics of the images displayed on the front surface ("left" surface shown in FIG. 4) of the display substrate 302. The communicative couplings 314 may include any communicative couplings known in the art including, but not limited to, metallized stirps, flexible circuits, copper pads, and the like.

The display device 301 may further include one or more optical coupling lamination layers 316 configured to couple the one or more heating layers 318 to the display substrate 302. For example, as shown in FIG. 4, the display device 301 may include an optical coupling lamination layer 316 configured to couple the heating layer 318 to the rear surface of the display substrate 302. In some embodiments, the one or more optical coupling lamination layers 316 may be fabricated from a conductive material configured to transfer heat from the one or more heating layers 318 to the display substrate 302. It is noted herein that the one or more optical coupling lamination layers 316 may include any layers known in the art configured to couple various layers of a display device 301.

In some embodiments, the one or more heating layers 318 and/or the one or more optical coupling lamination layers 316 may be transparent, or substantially transparent. It is noted herein that transparent heating layers 318 and/or optical coupling lamination layers 316 may reduce optical aberrations and improve optical quality of the display device 301. For example, in the context of LCD substrate (display substrate 302), a backlight 322 may be configured to generate light/illumination such that the LCD substrate (display substrate 302) transmits light generated by the backlight 322 through the LCD substrate in order to generate images on the front surface of the LCD substrate (display substrate 302). In this example, transparent and/or substantially transparent hating layers 318 and/or optical coupling lamination layers 316 may improve transmission of light from the backlight 322 to the LCD substrate, thereby improving the luminance level of the LCD substrate and reducing the power requirements for the display device 301. In embodiments, the backlight 322 may be communicatively coupled to the controller 304. In this regard, the controller 304 may be configured to generate one or more control signals configured to adjust one or more characteristics of the backlight 322 (e.g., luminance level, and the like).

In embodiments, a single heating layer 318 may include one or more heating layer portions 319a, 319b. For example, as shown in FIG. 4, a single heating layer 318 may include a first heating layer portion 319a and a second heating layer portion 319b. In embodiments, each respective heating layer portion 319a, 319b is configured to be coupled to the display substrate 302 such that it is proximate to each respective display zone 312a, 312b. For example, the heating layer 318 may be coupled to the display substrate 302 such that the first heating layer portion 319a is proximate to the first display zone 312a, and the second heating layer portion 319b is proximate to the second display zone 312b.

As will be discussed in further detail herein, by generating an electric current within the first heating layer portion 319a, the controller 304 may be configured to warm-up the first heating layer portion 319a, and thereby warm-up the first display zone 312a. Similarly, by generating an electric current within the second heating layer portion 319b, the controller 304 may be configured to warm-up the second heating layer portion 319b, and thereby warm-up the second display zone 312b. In this regard, the one or more heating layers 318 illustrated in FIG. 4 may be configured to warm-up various display zones 312 of the display substrate 302 from the rear side of the display substrate 302.

While FIG. 4 illustrates heating layers 318 disposed between the display substrate 302 and the backlight 322, this is not to be regarded as a limitation of the present disclosure, unless noted otherwise herein. In this regard, the display device 301 may additionally and/or alternatively include one or more heating layers 318 coupled to the front surface of the display substrate 302. For example, the display device 301 may include a first heating layer 318 coupled to the front surface of the display substrate 302 in order to warm-up the display substrate 302 from the front surface, and second heating layer 318 coupled to the rear surface of the display substrate 302 in order to warm-up the display substrate 302 from the rear surface.

In embodiments, the one or more heating layers 318 may include one or more electrical couplings 320 configured to electrically couple the one or more heating layers 318 to the controller 304. The one or more electrical couplings 320 may include any electrical couplings known in the art including, but not limited to, metallized strips, flexible circuits, copper pads, anisotropic conductive film (ACF) bonds, and the like. During start-up, electrical currents may be passed through the one or more heating layers 318, via the electrical couplings 320, in order to heat up selected heating layer portions 319a, 319b of the heating layer 318, and therefore warm-up selected display zones 312a, 312b of the display substrate 302.

The one or more heating layers 318 may include any heating layers known in the art configured to transfer heat to the display substrate 302. Thus, the one or more heating layers 318 may be formed from a conductive material or substance. For example, the one or more heating layers 318 may include indium tin oxide (ITO) layers. For instance, the one or more heating layers 318 may include a glass layer coated with a thin layer of ITO. By way of another example, the one or more heating layers 318 may include a micro mesh film layer formed with a conductive metal material.

Figure 5A:
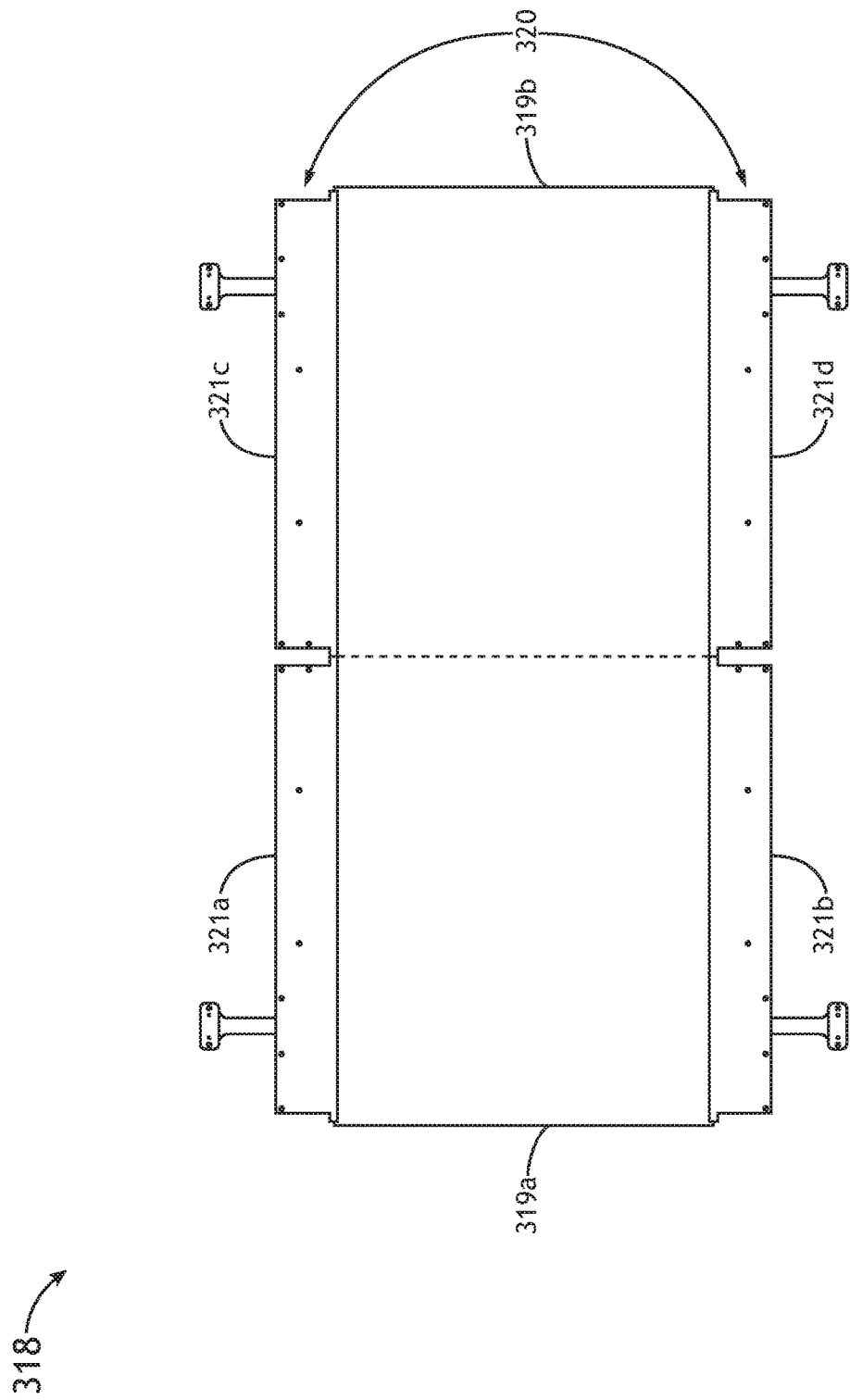
FIG. 5A illustrates a simplified view of a heating layer of a display device, in accordance with one or more embodiments of the present disclosure.
Figure 5B:
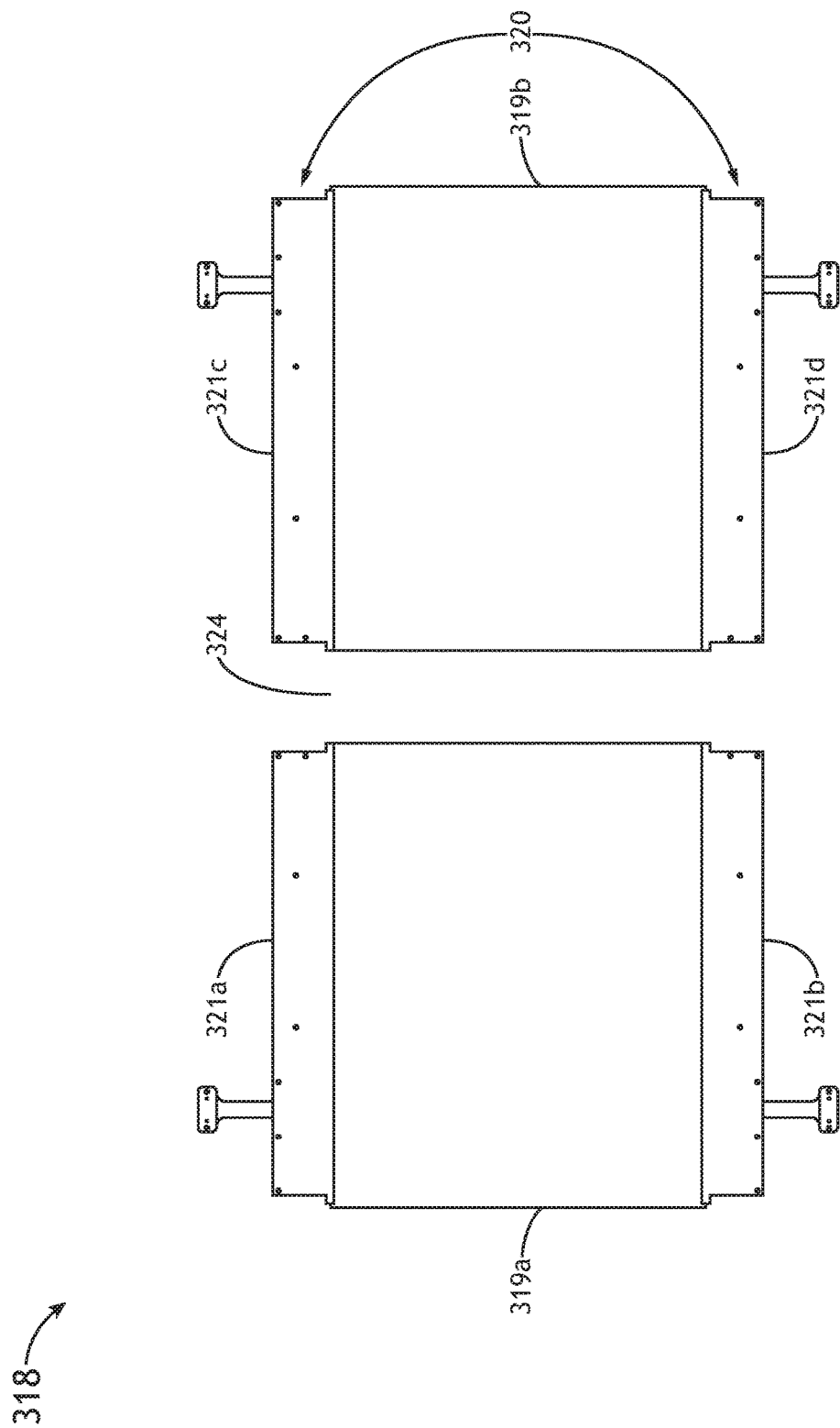
FIG. 5B illustrates a simplified view of a heating layer of a display device, in accordance with one or more embodiments of the present disclosure.

Operation of the one or more heating layers 318 may be further understood with reference to FIG. 5A and FIG. 5B.

FIG. 5A illustrates a simplified view of a heating layer 318 of a display device 301, in accordance with one or more embodiments of the present disclosure.

The heating layer 318 may include multiple heating layer portions 319a, 319b. As noted previously herein, the heating layer 318 may include multiple heating layer portions 319a, 319b such that each display zone 312a, 312b of the display substrate 302 corresponds to a respective heating layer portion 319a, 319b of the heating layer 318. In this regard, each heating layer portion 319 may exhibit approximately the same size and/or shape as the respective display zone 312.

For example, as shown in FIGS. 3A-3B and FIG. 4, a display substrate 302 may include a first display zone 312a and a second display zone 312b, wherein each of the first display zone 312a and a second display zone 312b make up approximately half of the display substrate 302. In this example, as shown in FIG. 5A, the heating layer 318 may include a first heating layer portion 319a coupled and/or corresponding to the first display zone 312a, and a second heating layer portion 319b coupled and/or corresponding to the second display zone 312b.

By way of another example, as shown in FIG. 3B, a display substrate 302 may include a first display zone 312a, a second display zone 312b, and a third display zone 312c. In this example, a heating layer 318 may include a first heating layer portion 319a coupled and/or corresponding to the first display zone 312a, and a second heating layer portion 319b coupled and/or corresponding to the second display zone 312b, and a third heating layer portion 319c (not shown) coupled and/or corresponding to the third display zone 312c. It is noted herein that the various display zones 312, and therefore the various heating layer portions 319, may exhibit any shape or size known in the art, and need not be equivalent in size to one another.

Reference will again be made to FIG. 5A. In embodiments, the heating layer 318 may further include one or more electrical couplings 320 configured to electrically/communicatively couple the heating layer 318 to the controller 304. For example, as shown in FIG. 5A, the heating layer 318 may include a first set of one or more electrical couplings 320 coupled to the heating layer 318 along an upper edge of the heating layer 318, and a second set of one or more electrical couplings 320 coupled to the heating layer 318 along a lower edge of the heating layer 318.

Further, the one or more electrical couplings 320 may include sub-sets of electrical couplings 321 coupled to each respective heating layer portion 319. For example, as shown in FIG. 5A, the first heating layer portion 319a may include a first sub-set of one or more electrical couplings 321a coupled to the first heating layer portion 319a along an upper edge of the first heating layer portion 319a, and a second sub-set of one or more electrical couplings 321b coupled to the first heating layer portion 319a along a lower edge of the first heating layer portion 319a. Conversely, the second heating layer portion 319b may include a first sub-set of one or more electrical couplings 321c coupled to the second heating layer portion 319b along an upper edge of the second heating layer portion 319b, and a second sub-set of one or more electrical couplings 321c coupled to the second heating layer portion 319b along a lower edge of the second heating layer portion 319b.

In embodiments, each of the electrical couplings 320 and/or sub-sets of electrical couplings 321 may be disposed across each of the respective upper and lower edges of each heating layer portion 319 so as to ensure a uniform current density across the heating layer portion 319. For example, as showing FIG. 5A, the first sub-set of one or more electrical couplings 321a may be coupled to the first heating layer portion 319a across the entirety of the upper edge of the first heating layer portion 319a, and the second sub-set of one or more electrical couplings 321b may be coupled to the first heating layer portion 319a along the entirety of the lower edge of the first heating layer portion 319a. In this example, it is contemplated herein that disposing the first sub-set of electrical couplings 321a across the length of the upper edge, and the second sub-set of electrical couplings 321b across the length of the lower edge, the heating layer portion 319a may warm-up uniformly, and thereby uniformly heat the first display zone 312.

While the electrical couplings 320 and sub-sets of electrical coupling 321 are shown and described as being disposed along upper and lower edge of the heating layer 318, this is not to be regarded as a limitation of the present disclosure, unless noted otherwise herein. In this regard, the one or more electrical couplings 320 may be coupled to the heating layer 318 in any configuration known in the art. For example, in embodiments where display zones 312 and heating layer portions 319 are arranged horizontally across the display device 301, the electrical couplings 320 and sub-sets of electrical couplings 321 may be coupled to the respective heating layer portions 319 along a first "left" edge and a second "right" edge opposite the first edge of each heating layer portion 319.

FIG. 5B illustrates a simplified view of a heating layer 318 of a display device 301, in accordance with one or more embodiments of the present disclosure. It is noted herein that any discussion associated with the heating layer 318 illustrated in FIG. 5A may be regarded as applying to the heating layer 318 illustrated in FIG. 5B, unless noted otherwise herein. Conversely, any discussion associated with the heating layer 318 illustrated in FIG. 5B may be regarded as applying to the heating layer 318 illustrated in FIG. 5A, unless noted otherwise herein.

In some embodiments, the heating layer portions 319a, 319b may be electrically and/or physically separated such that each respective heating layer portion 319a, 319b is electrically isolated from one another. It is noted herein that electrically isolating each heating layer portion 319a, 319b from one another may prevent electrical current "bleeding" between heating layer portions 319a-319b, and may therefore allow for electrical currents generated within the heating layer portions 319a-319b to be localized and maintained within the designated heating layer portion 319a-319b. For example, as shown in FIG. 5B, the first heating layer portion 319a and the second heating layer portion 319b may be separated by one or more spacers 324. The spacers 324 may be configured to prevent electrical currents generated within one heating layer portion 319 from "bleeding" or otherwise passing to other heating layer portions 319. The one or more spacers 324 configured to separate the heating layer portions 319 may include, but are not limited to, chemical etching of the conductive material, physical spaces or gaps, strips of non-conductive material, and the like.

As noted previously herein, the one or more processors 306 may be configured to execute the set of program instructions stored in memory 308, the set of program instructions configured to cause the one or more processors 306 to carry out one or more steps of the present disclosure. In embodiments, the controller 304 may be configured to generate one or more control signals configured to warm up selected/localized zones of the heating layer 318 and display substrate 302 in a selective manner.

In embodiments, the controller 304 may be configured to generate one or more control signals configured to generate a first electrical current within the first heating layer portion 319a in order to increase a temperature of the first display zone 312a of the display substrate 302. In particular, the controller 304 may be configured to increase the temperature of the first display zone 312a by heating the first heating layer portion 319a in response to an identified display warm-up request.

For example, as shown in FIG. 1 and FIGS. 3A-3C, an aircraft pilot may start, engage, or otherwise activate the aircraft and/or the display device 301 of the aircraft via a user interface 310. For instance, the aircraft pilot may engage a starter sub-system of the aircraft (e.g., user interface 310) in preparation for a flight. The user interface 310 may then be configured to transmit a display warm-up request to the controller 304, indicating that the display substrate 302 of the display device 301 is to be warmed up. Upon receiving the display warm-up request, the controller 304 may be configured to generate the one or more control signals configured to generate the first electrical current within the first heating layer portion 319a in response to the display warm-up request.

By heating up the first heating layer portion 319a, the controller 304 may thereby also heat up the first display zone 312a of the display substrate 302. Due to the fact that the power and heating capabilities of the warm-up system 300 are focused on only a portion of the display substrate 302 (e.g., first display zone 312a), the first display zone 312a may heat up faster than it would if the entire display substrate 302 were heated simultaneously.

In this regard, it is contemplated herein that the first display zone 312a of the display substrate 302 may include the most important, critical data which is to be displayed on the display substrate 302. The first display zone 312a may additionally and/or alternatively include data/metrics which must be displayed and monitored by a user (e.g., aircraft pilot) first in time. In the context of aviation, data/metrics which are most critical and therefore which should be warmed-up first may include, but are not limited to, engine-indicating and crew-alerting (EICAS) information (e.g., engine revolutions per minute (RPM), engine temperature, fuel flow and quantity, oil pressure, hydraulic pressures).

The controller 304 may be configured to generate electrical currents within the heating layer portions 319 by generating a voltage difference between the electrical couplings 320. For example, as shown in FIG. 5A, the controller 304 may generate a voltage difference of approximately 30V between the first sub-set of electrical couplings 321a and the second set of electrical couplings 321b such that an electrical current flows between the respective sub-sets of electrical couplings 321a, 321b in a substantially "vertical" direction. By way of another example, in embodiments where the sub-sets of electrical couplings 321a, 321b are coupled to the heating layer 318 along a first "left" edge and a second "right" edge, the electrical current may flow between the respective sub-sets of electrical couplings 321a in a substantially "horizontal" direction.

In another embodiment, the controller 304 may be configured to warm-up additional display zones 312b-312n once the first display zone 312a has reached operating temperature. It is noted herein that the controller 304 may be configured to determine temperatures of each respective display zone 312 using any technique known in the art. For example, it is noted herein that impedance of an ITO layer (e.g., heating layer 318) may change with changing temperature. In this example, the controller 304 may be configured to measure resistance values of the ITO layer with etched paths disposed within the display substrate 302. By monitoring/measuring resistance values of the ITO layer within a particular display zone 312, the controller 304 may be configured to determine a temperature of the particular display zone 312 based on the measured resistance values and the relationship between impedance/resistance and temperature. Thus, the controller 304 may determine the temperature of a display zone 312 based on measured impedance and/or resistance values of the display zone 312.

An example may prove to be illustrative. In one example, the controller 304 may receive a display warm-up request at a first time, and may then generate one or more control signals configured to generate the first electrical current within the first heating layer portion 319a at the first time in response to the display warm-up request. The electrical current may then warm-up the first heating layer portion 319a, and thereby warm-up the first display zone 312a of the display substrate 302. The controller 304 may be configured to monitor the temperature of the first display zone 312a. Subsequently, the controller 304 may be configured to determine the temperature of the first display zone 312a exceeds a temperature threshold at a second time subsequent to the first time. For instance, the controller 304 may be configured to determine when the first display zone 312a reaches an operational temperature or other sufficient temperature (e.g., temperature threshold). Upon determining the first display zone 312a has been sufficiently heated, the controller 304 may be configured to generate one or more control signals configured to generate a second electrical current within the second heating layer portion 319b at the second time. Accordingly, the controller 304 may be configured to begin warming up the second display zone 312b (and/or additional display zones 312c-312n) when the first display zone 312a has been sufficiently heated.

When heating the second display zone 312b, the controller 304 may continue to heat the first display zone 312a, or may cease to heat the first display zone 312a. For example, upon identifying the first display zone 312a is sufficiently heated, the controller 304 may be configured to generate the one or more control signals configured to terminate the first electrical current at the second time. In this example, the controller 304 may begin to heat the second display zone 312b as well as terminate the heating of the first display zone 312a when it is determined the first display zone 312a is sufficiently heated at the second time.

While the examples provided have been in the context of a display substrate 302 including two separate display zones 312a, 312b and a heating layer 318 including two separate heating layer portions 319a, 319b, this is not to be regarded as a limitation of the present disclosure, unless noted otherwise herein. In this regard, the controller 304 may be configured to selectively heat any number of heating layer portions 319a-319n and display zones 312a-312n, as described previously herein.

Figure 6:
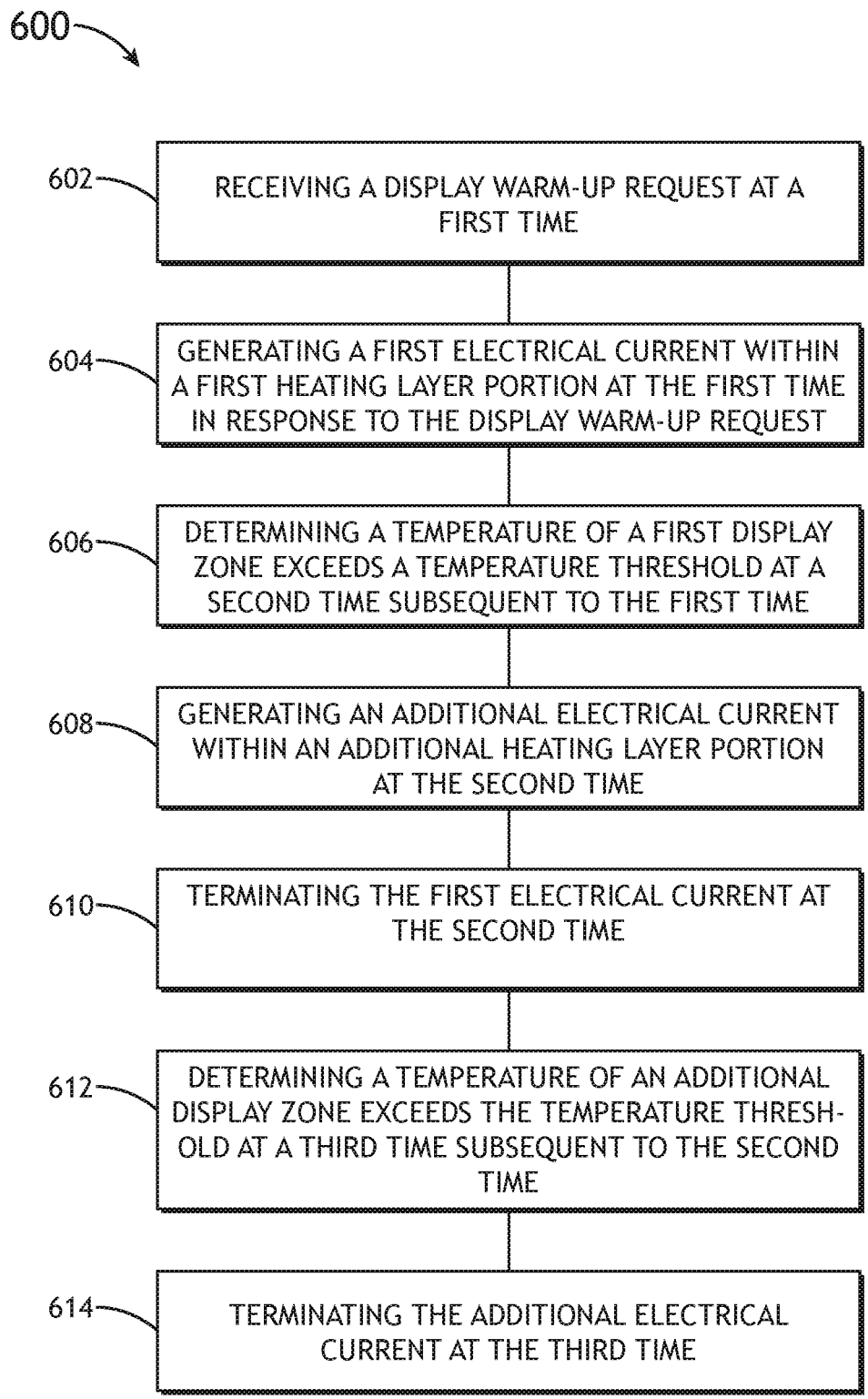
FIG. 6 illustrates flowchart of a method for improving warm-up time of a display device, in accordance with one or more embodiments of the present disclosure.

FIG. 6 illustrates flowchart of a method 600 for improving warm-up time of a display device 301, in accordance with one or more embodiments of the present disclosure. It is noted herein that the steps of method 600 may be implemented all or in part by warm-up system 300. It is further recognized, however, that the method 600 is not limited to the warm-up system 300 in that additional or alternative system-level embodiments may carry out all or part of the steps of method 600.

In a step 602, a display warm-up request is received at a first time. For example, an aircraft pilot may start, engage, or otherwise activate an aircraft and/or a display device 301 of the aircraft via a user interface 310. The user interface 310 may then be configured to transmit a display warm-up request to the controller 304, indicating that the display substrate 302 of the display device 301 is to be warmed up.

In a step 604, a first electrical current is generated within a first heating layer portion at the first time in response to the display warm-up request. For example, upon receiving the display warm-up request, the controller 304 may be configured to generate the one or more control signals configured to generate the first electrical current within the first heating layer portion 318a in response to the display warm-up request. By generating the first electrical current within the first heating layer portion 319a, the controller 304 may be configured to warm-up the first heating layer portion 319a, and thereby warm-up the first display zone 312a.

In a step 606, a temperature of a first display zone is determined to exceed a temperature threshold at a second time subsequent to the first time. For example, the controller 304 may be configured to determine the temperature of the first display zone 312a exceeds a temperature threshold at a second time subsequent to the first time. For instance, the controller 304 may be configured to determine when the first display zone 312a reaches an operational temperature or other sufficient temperature (e.g., temperature threshold).

In a step 608, an additional electrical current is generated within an additional heating layer portion at the second time. For example, upon determining the first display zone 312a has been sufficiently heated, the controller 304 may be configured to generate one or more control signals configured to generate a second electrical current within the second heating layer portion 319b at the second time. Accordingly, the controller 304 may be configured to begin warming up the second display zone 312b (and/or additional display zones 312c-312n) when the first display zone 312a has been sufficiently heated.

In a step 610, the first electrical current is terminated at the second time. For example, upon identifying the first display zone 312a is sufficiently heated, the controller 304 may be configured to generate the one or more control signals configured to terminate the first electrical current at the second time. In this example, the controller 304 may begin to heat the second display zone 312b as well as end the heating of the first display zone 312a when it is determined the first display zone 312a is sufficiently heated at the second time.

In a step 612, a temperature of an additional display zone is determined to exceed the temperature threshold at a third time subsequent to the second time. For example, the controller 304 may be configured to determine the temperature of the second display zone 312b exceeds a temperature threshold at a third time subsequent to the second time. For instance, the controller 304 may be configured to determine when the second display zone 312b reaches an operational temperature or other sufficient temperature (e.g., temperature threshold).

In a step 614, the additional electrical current is terminated at the third time. For example, upon identifying the second display zone 312b is sufficiently heated, the controller 304 may be configured to generate the one or more control signals configured to terminate the second electrical current at the third time.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A display warm-up system comprising:
a display device comprising:
a display substrate configured to display at least one image on a front surface of the display substrate, the display substrate including a first display zone and at least one additional display zone; and
one or more heating layers coupled to the display substrate, the one or more heating layers including a first heating layer portion and at least one additional heating layer portion; and
a controller communicatively coupled to the one or more heating layers via one or more electrical couplings, the controller configured to:
generate one or more control signals configured to generate a first electrical current within the first heating layer portion in order to increase a temperature of the first display zone of the display substrate;
generate one or more control signals configured to generate at least one additional electrical current within the at least one additional heating layer portion in order to increase a temperature of the at least one additional display zone of the display substrate;
receive a display warm-up request at a first time;
generate the one or more control signals configured to generate the first electrical current at the first time in response to the display warm-up request;
determine the temperature of the first display zone exceeds a temperature threshold at a second time subsequent to the first time;
generate the one or more control signals configured to generate the at least one additional electrical current at the second time; and
generate one or more control signals configured to terminate the first electrical current at the second time.

2. The system of claim 1,
wherein the at least one additional display zone comprises a second display zone and a third display zone,
wherein the least one additional heating layer portion comprises a second heating layer portion coupled to the display substrate proximate to the second display zone, and a third heating layer portion coupled to the display substrate proximate to the third display zone.

3. The system of claim 2, generating one or more control signals configured to generate at least one additional electrical current within the at least one additional heating layer portion in order to increase a temperature of the at least one additional display zone of the display substrate comprises:
generating one or more control signals configured to generate a second electrical current within the second heating layer portion in order to increase a temperature of the second display zone of the display substrate; and
generating one or more control signals configured to generate a third electrical current within the third heating layer portion in order to increase a temperature of the third display zone of the display substrate.

4. The system of claim 1, wherein the one or more electrical couplings include:
a first set of one or more electrical couplings configured to electrically couple the controller to the first heating layer portion; and
at least one additional set of one or more electrical couplings configured to electrically couple the controller to the at least one additional heating layer portion.

5. The system of claim 4, wherein the first set of one or more electrical couplings comprises:
a first sub-set of one or more electrical couplings coupled to the first heating layer portion along a first edge of the first heating layer portion; and
a second sub-set of one or more electrical couplings coupled to the first heating layer portion along a second edge of the first heating layer portion opposite the first edge.

6. The system of claim 1, wherein the first heating layer portion and the at least one additional heating layer portion are electrically isolated from one another.

7. The system of claim 1, wherein the display device is disposed within a cockpit of an aircraft.

8. The system of claim 1, wherein at least one of the first heating layer portion or the at least one additional heating layer portion comprises an indium tin oxide (ITO) layer.

9. The system of claim 1, wherein the one or more electrical couplings comprise at least one of a metalized strip or a flexible circuit.

10. The system of claim 1,
wherein the display substrate comprises a liquid crystal display (LCD) substrate, and
wherein the display device further includes a backlight coupled to the one or more heating layers, wherein the one or more heating layers are disposed between the display substrate and the backlight.

11. The system of claim 1, wherein the first display zone includes engine-indicating and crew-alerting (EICAS) information.

12. The system of claim 11, wherein the display device is disposed within at least one of an aircraft cockpit, an automobile, an aquatic vehicle, or a spacecraft.

13. A system for optimizing warm-up time of a display device, comprising:
one or more heating layers coupled to a surface of a display substrate of the display device, the one or more heating layers including a first heating layer portion and at least one additional heating layer portion; and
a controller communicatively coupled to the first heating layer portion and the at least one additional heating layer portion, the controller configured to:
generate one or more control signals configured to generate a first electrical current within the first heating layer portion in order to increase a temperature of a first display zone of the display substrate;
generate one or more control signals configured to generate at least one additional electrical current within the at least one additional heating layer portion in order to increase a temperature of at least one additional display zone of the display substrate;
receive a display warm-up request at a first time;
generate the one or more control signals configured to generate the first electrical current at the first time in response to the display warm-up request;
determine the temperature of the first display zone exceeds a temperature threshold at a second time subsequent to the first time;
generate the one or more control signals configured to generate the at least one additional electrical current at the second time; and
generate one or more control signals configured to terminate the first electrical current at the second time.

* * * * *